United States Patent [19]

Holst et al.

[11] 4,316,982

[45] Feb. 23, 1982

[54] PROCESS FOR REDUCING THE VISCOSITY OF CELLULOSE ETHERS BY MEANS OF OZONE AND APPLICATION THEREOF

[75] Inventors: Arno Holst, Wiesbaden; Eberhard Perplies, Walluf, both of Fed. Rep. of Germany

[73] Assignee: Hoechst Aktiengesellschaft, Fed. Rep. of Germany

[21] Appl. No.: 142,883

[22] Filed: Apr. 23, 1980

[30] Foreign Application Priority Data

Apr. 27, 1979 [DE] Fed. Rep. of Germany ....... 2917104

[51] Int. Cl.$^3$ .............................................. C08B 11/20
[52] U.S. Cl. ........................................ 536/88; 536/85
[58] Field of Search .................................... 536/88, 85

[56] References Cited

U.S. PATENT DOCUMENTS

| | | | |
|---|---|---|---|
| 2,238,912 | 4/1941 | McHard et al. | 536/85 |
| 2,422,572 | 6/1947 | Lilienfeld | 536/85 |
| 2,512,338 | 6/1950 | Klug et al. | 536/88 |
| 2,572,559 | 10/1951 | Chittum | 536/88 |
| 2,895,891 | 7/1959 | Miller | 204/154 |
| 2,912,431 | 11/1959 | Leonard et al. | 536/88 |
| 3,138,564 | 6/1964 | Borunsky | 260/17 |
| 3,296,248 | 1/1967 | Mitchell | 536/88 |
| 4,034,764 | 7/1977 | Rainer et al. | 131/2 |
| 4,061,859 | 12/1977 | Cheng | 536/88 |

FOREIGN PATENT DOCUMENTS

| | | |
|---|---|---|
| 667864 | 10/1938 | Fed. Rep. of Germany. |
| 2016203 | 2/1974 | Fed. Rep. of Germany. |
| 461455 | 10/1968 | Switzerland. |
| 953944 | 4/1964 | United Kingdom. |

OTHER PUBLICATIONS

Simonescu et al., "Study of the Grafting of Carboxymethy Cellulose with Acrylonitrile" published in Faserforschung und Textiltechnik 13, 1962, No. 2, pp. 70–79.

Journal of Polymer Science, vol. 4, 1966, pp. 2683–2703.

"Ullmann's Encyklopädie der technischen Chemie", Verlag Urban and Schwarzenberg, Munich/Berlin, 3rd Edition, 1964, vol. 15, pp. 98–103.

Journal of Polymer Science, Part A-1, vol. 4, 1966, pp. 2683 to 2703, A. A. Katai et al.

Abstracts Bulletin of the Institute of Paper Chemistry, vol. 34, 1964, No. 4403, J. Alföldi et al.

*Primary Examiner*—Ronald W. Griffin
*Attorney, Agent, or Firm*—James E. Bryan

[57] ABSTRACT

This invention relates to a process for reducing the viscosity of cellulose ethers by reacting a water-soluble cellulose ether with ozone in the presence of water, wherein said cellulose ether which is moist with water and has a dry content of from 20 to 95% by weight is reacted with an ozone/oxygen mixture or with an ozone/air mixture at a temperature of about 0° to 60° C.

4 Claims, No Drawings

PROCESS FOR REDUCING THE VISCOSITY OF CELLULOSE ETHERS BY MEANS OF OZONE AND APPLICATION THEREOF

This invention relates to a process for reducing the viscosity of water-soluble cellulose ethers by reaction thereof with ozone and to an application of the process of the invention.

For various fields of application, cellulose ethers of widely differing properties are required. In addition to their solubility behavior or their degree of substitution, one of the decisive parameters of characterizing cellulose ethers is their viscosity. For the preparation of low-viscosity water-soluble cellulose ethers, three methods are essentially described in the literature on the subject, which all have as their principal object a splitting of molecular chains, i.e. starting materials with a relatively higher molecular mass are used to produce intermediate or final products with a lower molecular mass. This object is attained, either by degrading the cellulose molecule prior to or during etherification or by degrading the cellulose ether molecule. The most important disadvantage of intermediate products obtained according to the two first-mentioned methods is that these intermediate products have comparatively short-chain molecules, before being subjected to the purifying stages which are normally employed in the processes of preparing these cellulose ethers. As a result, they either swell too greatly in the purifying liquid (usually consisting of water or aqueous organic solvents) or they dissolve therein to an excessive degree, in the same way as the impurities.

For carrying out the third method, a degradation, for example, using chemical oxidizing agents, such as a hypochlorite or $H_2O_2$, and a degradation by means of high-energy radiation are known.

German Pat. No. 667,864 describes a process for the viscosity reduction of aqueous solutions of cellulose ethers, wherein microorganisms or enzymes are caused to act upon aqueous cellulose ether solutions. The viscosity is thus reduced to about 50% of the initial value.

In the process for reducing the viscosity of cellulose ethers by means of hydrogen peroxide, according to German Auslegeschrift No. 2,016,203, a substantially dry, free-flowing particulate cellulose ether is mixed with a 10 to 50% concentration hydrogen peroxide solution, and this mixture is heated to a temperature of 50° to 150° C., until the cellulose ether exhibits a lower viscosity. Depending upon the amount of $H_2O_2$, the reaction temperature, the reaction time and the value of the initial viscosity, the viscosity is reduced to about 1% of the initial value.

Swiss Pat. No. 461,455 discloses a process for the manufacture of low-viscosity, water-soluble cellulose ethers by oxidative degradation of higher viscosity ethers with $H_2O_2$; in the process, the cellulose ether, which is moist with water, is mixed with an aqueous solution of $H_2O_2$ choosing a specific mixing proportion of ether, $H_2O_2$ and water content, and the mixture is then dried at a temperature between about 100° and 250° C., until the $H_2O_2$ is completely spent. The viscosity is reduced to about 0.5% of the initial value.

In British Pat. No. 953,944, a process for reducing the viscosity of water-soluble, non-ionic cellulose ethers is described, wherein the ethers are, in an aqueous suspension or by spraying, caused to react with an aqueous solution of $H_2O_2$ at temperatures ranging between about 70° and 100° C. The viscosity is reduced to about 0.5% of the initial value.

In the process according to U.S. Pat. No. 2,512,338, the viscosity is regulated by adding a mixture of $H_2O_2$ or of a metallic peroxide and a salt of a metal having a Mn, Co, Fe or Pb ion to the reaction mixture of alkali cellulose and an etherifying agent. The viscosity is reduced to about 0.3% of the initial value.

U.S. Pat. No. 2,895,891, discloses an irradiation of cellulose ethers with ionizing radiation, which results in a viscosity reduction in non-ionic and ionic cellulose ethers which are in a dry state. A viscosity reduction also in a (water) moist state is, however, observed only in ionic cellulose ethers, but not in non-ionic cellulose ethers which are crosslinked under these conditions.

According to U.S. Pat. No. 2,912,431, a salt containing an alkali metal, alkaline earth or ammonium cation and a hypohalite, peroxide or periodate anion, is added to a mixture of a fibrous carboxyalkyl cellulose and an aqueous alcohol, to achieve bleaching, viscosity reduction and densification. The viscosity is reduced to about 1% of the initial value; the reaction temperature ranges between 40° and 80° C.

In the process described in U.S. Pat. No. 4,061,859, a dry cellulose ether powder is (a) first reacted with a gaseous hydrogen halide at a temperature of up to about 80° C. and then (b) with a gaseous sulfur dioxide at room temperature, to obtain a viscosity reduction and, simultaneously, a reduction of the molecular mass. By the additional process step (b), a discoloration (mainly a yellow coloration) of the cellulose ether is prevented, which occurs when process step (a) only is carried out. The viscosity is reduced to about 0.05% of the initial value; the moisture content in the cellulose ether powder to be treated should not exceed a maximum value of about 5%.

The previously proposed processes using $H_2O_2$ or a hypochlorite as the oxidizing agent have the disadvantages that, on the one hand, the reaction must be carried out at a temperature in the range from 40° to 150° C. and that, on the other hand, the viscosity of the products obtained in these processes is unstable, because when storing the products their viscosity is often further reduced. The viscosity reduction of the cellulose ethers should, if possible, be accomplished when the products already have been washed out and are still moist. Therefore, it is disadvantageous to use high-energy radiation for degradation, because with the non-ionic cellulose ether types, this procedure cannot be performed without adverse side reactions (crosslinking). Similarly, a degradation with HCl gas and/or $SO_2$ gas is unfavorable, because in that case the moisture already must have been removed to a very high degree; in addition, considerable corrosion problems are encountered when the last-mentioned gases are employed.

Reactions of cellulose or cellulose ether derivatives with ozone are known.

In U.S. Pat. No. 3,138,564, a process is disclosed, wherein polymerizable monomers containing vinylidene groups are grafted onto a polysaccharide which previously was treated, in an aqueous dispersion or solution, with ozone or with an ozone-containing gas. The excess ozone is flushed out of the reaction mixture with the aid of an inert gas. As a polysaccharide starting material, carboxymethyl cellulose is, among others, mentioned. This reaction between a polysaccharide and ozone serves to produce free-radical intermediate stages for the subsequent grafting operation; obviously, a degrading reaction is not particularly intended.

According to the paper "Study of the Grafting of Carboxymethyl Cellulose with Acrylonitrile" by C. Simionescu, D. Feldman and C. Vasiliu, published in "Faserforschung und Textiltechnik 13" ("Fiber Research and Textile Technology 13"), 1962, No. 2, pages 70 to 79, grafting can be initiated, in the presence of $Ce^{4+}$ ions, by ultrasonic waves, ultraviolet radiation, a magnetic field or by ozonization. It is also pointed out that a certain decrease in viscosity is observed which may lead to a reduction of the molecular mass by about one half. In addition to the starting material carboxymethyl cellulose, methyl cellulose is also employed. The cellulose ethers which are in the form of films are treated in an aqueous, weakly acid solution, in the presence of $Ce^{4+}$ ions.

In the paper "Mechanism of Ozone Attack on α-Methyl Glucoside and Cellulosic Materials" by A. A. Katai and C. Schuerch, published in the "Journal of Polymer Science", volume 4, 1966, pages 2683 to 2703, the interaction between ozone and methyl cellulose having a degree of substitution of 1.5 is, among others, described. With an increasing amount of reacted ozone, the molecular mass of the methyl cellulose decreases and the number of carbonyl and carboxyl groups on the molecules increases, and these changes occur if ozonization takes place both in an oxygen atmosphere and in a nitrogen atmosphere. The ozonization procedure is performed in a 1.6% by weight concentration aqueous methyl cellulose solution.

These processes of reacting water-soluble cellulose ethers with ozone have the disadvantage that reaction is carried out in an aqueous solution, because industrial scale plants for the manufacture of cellulose ethers would need an additional dissolving stage for that purpose, and this would, e.g., on the one hand, lead to large-volume vessels for dissolving (highly concentrated cellulose ether solutions are difficult to prepare) and, on the other hand, to an energy-consuming removal of the dissolving agent.

It is, therefore, an object of the present invention to provide a process for reducing the viscosity of water-soluble cellulose ethers, which can be performed at room temperature or at a temperature which is not substantially above room temperature, without the need for a considerable expenditure for additional apparatus, and which yields products the viscosity of which remains stable in storage.

The invention is based on a process for reducing the viscosity of cellulose ethers, by reacting water-soluble cellulose ethers with ozone in the presence of water. The process of the invention has the feature that a cellulose ether which is moist with water and has a dry content of from 20 to 95% by weight is reacted with an ozone/oxygen mixture or with an ozone/air mixture at a temperature ranging from about 0° to 60° C.

The water-soluble cellulose ethers used are, particularly, hydroxyalkyl celluloses which have a hydroxyalkyl group containing from 2 to 4 carbon atoms, for example, hydroxyethyl cellulose or hydroxypropyl cellulose; alkyl celluloses which have an alkyl group containing 1 or 2 carbon atoms, for example, methyl cellulose; carboxyalkyl celluloses which have a carboxyalkyl group containing 2 or 3 carbon atoms, for example, carboxymethyl cellulose; or the mixed ethers thereof, for example, methyl hydroxyethyl cellulose, methyl hydroxypropyl cellulose, ethyl hydroxyethyl cellulose, hydroxyethyl hydroxypropyl cellulose, methyl carboxymethyl cellulose or methyl hyroxyethyl hydroxypropyl cellulose.

In preferred embodiments of the process according to the invention, the dry content of the cellulose ether which is moist with water ranges from 40 to 75% by weight and the ozone is reacted at a temperature between about 15° and 40° C.

The manufacture of ozone on an industrial scale and the methodology of the application of ozone are known; in this connection "Ullmann's Encyklopädie der technischen Chemie" ("Ullmann's Encyclopedia of Industrial Chemistry"), Verlag Urban and Schwarzenberg, Munich/Berlin, 3rd edition, 1964, volume 15, pages 98 to 103, is, for example, mentioned. In the process of the invention, the ozone which is either in the form of an ozone/oxygen mixture or of an ozone/air mixture, is uniformly admixed to the cellulose ether which is moist with water and reacted in the mixing vessel. This operation is appropriately accomplished continuously or discontinuously using any of the commercially available mixers, such as kneader mixers, screw mixers, belt conveyor mixers or revolving drum mixers. The reaction times mainly depend upon the quantity of ozone supplied per part by weight of cellulose ether, the reaction temperature, the type of cellulose ether used, the amount of moisture and the intended degree of degradation. Normally, the reaction times range between about 5 minutes and 120 minutes. Upon completion of the planned reaction, the reaction mixture is dried according to any of the known methods.

The inventive process can be especially employed in one of the known methods of manufacturing a water-soluble cellulose ether, which methods basically comprise the stages of (a) alkalizing the cellulose, (b) etherifying, (c) washing out and (d) drying. Appropriately, ozonizing is then performed between stages (c) and (d), i.e., the cellulose ether which is in the form of a raw intermediate product having a comparatively higher viscosity (a relatively greater molecular mass) is freed from impurities in one of the conventional washing out stages, the adhering moisture is removed, for example, by centrifuging until the product which is moist with water exhibits a dry content of maximally 95% by weight, particularly of maximally 75% by weight; the moist product is ozonized and the product which then has a comparatively low viscosity (a relatively smaller molecular mass) is finally dried and, if desired, further processed.

Even after a storage period of 60 days, the viscosity of a cellulose ether manufactured according to the process of the invention is still in the range which has been determined at the beginning of the storage period, i.e., cellulose ethers which have been degraded by ozone have a viscosity which is stable in storage. Particularly in the case of non-ionic cellulose ethers, the viscosity can be reduced to about 0.02% and less of the initial value. The advantages of the inventive degradation by ozone further include, among others, a good capability of being dosed of the oxidizing agent, an uncomplicated destruction of non-reacted ozone residues already at relatively low temperatures (starting at about 60° C.), a small equipment expenditure for carrying out the process and the reactivity of ozone with respect to cellulose ether molecules already at room temperature.

The visocsity values given in the examples which follow were measured in a 2% by weight concentration aqueous solution of the respective cellulose ether at a temperature of 20° C. in a viscosimeter according to Höppler; the percentage values are by weight. The ozone/oxygen and ozone/air mixture were supplied by a commercial ozonizer. The degrees of substitution are referred to as DS or MS, depending upon the kind of substituent used.

EXAMPLE 1

100 g of a methyl hydroxyethyl cellulose (MHEC, $DS_M=1.62$, $MS_{HE}=0.19$) which is moist with water and has a dry content of 58.5%, is filled into a mixer and treated with an ozone/oxygen mixture (proportion of ozone about 1.6%) in a quantity of 60 l/h. The degraded product is dried at a temperature of 105° C.

EXAMPLE 2

The procedure of Example 1 is repeated using 100 g of a carboxymethyl cellulose (CMC, $DS_{CM}=0.79$) which is moist with water and has a dry content of 59.0%.

EXAMPLE 3

100 g of a methyl hydroxyethyl cellulose (MHEC, $DS_M=1.57$, $MS_{HE}=0.20$) which is moist with water and has a dry content of 59.8% is filled into a mixer and treated with an ozone/air mixture (proportion of ozone about 0.8%) in a quantity of 84 l/h. The degraded product is dried at a temperature of 80° C.

EXAMPLE 4

The procedure of Example 3 is repeated using 100 g of a hydroxyethyl cellulose (HEC, $MS_{HE}=2.50$, $DS_{HE}=1.16$) which is moist with water and has a dry content of 48.0%.

The test conditions and the measuring results obtained are compiled in the table below:

TABLE

| Example | Type of Cellulose Ether | Reaction Time, (min.) | Reaction Temperature, (°C.) | Viscosity, (mPas) |
| --- | --- | --- | --- | --- |
| 1 | MHEC | 0 | — | 30,000 |
|   |      | 5 | 30 | 28 |
|   |      | 10 | 30 | 11 |
|   |      | 30 | 30 | 5 |
| 2 | CMC  | 0 | — | 8,000 |
|   |      | 5 | 20 | 800 |
|   |      | 10 | 20 | 300 |
|   |      | 15 | 20 | 130 |
| 3 | MHEC | 0 | — | 30,000 |
|   |      | 5 | 25 | 115 |
|   |      | 10 | 25 | 35 |
|   |      | 30 | 25 | 10 |
| 4 | HEC  | 0 | — | 4,000 |
|   |      | 10 | 30 | 450 |
|   |      | 30 | 30 | 75 |
|   |      | 120 | 30 | 10 |

It will be obvious to those skilled in the art that many modifications may be made within the scope of the present invention without departing from the spirit thereof, and the invention includes all such modifications.

What is claimed is:

1. A process for reducing the viscosity of cellulose ethers by reacting a water-soluble cellulose ether with ozone in the presence of water, wherein said cellulose ether which is moist with water and has a dry content of from 40 to 75% by weight is reacted with an ozone/oxygen mixture or with an ozone/air mixture at a temperature of about 0° to 60° C.

2. A process as claimed in claim 1 wherein the reaction is carried out at a temperature between about 15° and 40° C.

3. A process for manufacturing a water-soluble cellulose ether which comprises (a) alkalizing cellulose, (b) etherifying, (c) washing out, (d) reducing the viscosity in accordance with the process of claim 1, and (e) drying.

4. A process for reducing the viscosity of cellulose ethers by reacting a water-soluble cellulose ether with ozone in the presence of water, wherein said cellulose ether is selected from the group consisting of hydroxyalkyl cellulose which has a hydroxyalkyl group containing from 2 to 4 carbon atoms, alkyl cellulose which has an alkyl group containing 1 or 2 carbon atoms, or one of the mixed ethers thereof, which is moist with water and has a dry content of from 40 to 75% by weight, is reacted with an ozone/oxygen mixture or with an ozone/air mixture at a temperature of about 0° to 60° C.

* * * * *